INVENTOR.
EDMUND U. COHLER
BY MICHAEL M. STERN
HERBERT A. ULLMAN
F. D. Sullivan
ATTORNEY INVENTOR.
EDMUND U. COHLER
BY MICHAEL M. STERN
HERBERT A. ULLMAN
F L Sullivan
ATTORNEY

United States Patent Office 3,210,741
Patented Oct. 5, 1965

3,210,741

DRIVE CIRCUIT FOR MAGNETIC ELEMENTS

Edmund U. Cohler and Michael M. Stern, Brookline, and Herbert A. Ullman, Burlington, Mass., assignors to Sylvania Electric Products Inc., a corporation of Delaware

Filed May 3, 1961, Ser. No. 107,418
3 Claims. (Cl. 340—174)

This invention is concerned with electronic data processing, and particularly with switching circuits for magnetic memories.

Copending U.S. Patent application Ser. No. 65,993, filed on October 31, 1960, now Patent No. 3,116,543 and also assigned to Sylvania Electric Products Inc. describes a current drive system for magnetic core memories of the type employed in computers and other electronic data processing systems. It and the other patent applications and references cited therein may be consulted for detailed descriptions of the core memories and associated operating circuitry with which this invention is concerned.

A primary object of the invention is to provide for magnetic core memories, "read" and "write" current switching systems which will give more reliable operation at faster memory cycle speeds than has hitherto been possible. Other objects are to accomplish such advantages and yet permit more relaxed tolerances on the addressing of individual circuits within the memory matrix, reduce the number of critical rise and fall time transistors in the memory driving matrix, stabilize memory access time, and provide an improved drive for magnetic memory systems.

These and related objects are accomplished in one illustrative embodiment of the invention by providing a common current source and a common current shunt for all of the individual drive lines in a given "read" or "write" driving matrix. Each drive line has one or more current switches which complete its circuit to the cores linked by it, and these switches are selectively closed to address a selected line of cores.

The current shunt is normally operative to bypass current away from the drive lines and individual lines are energized by closing their selection switches and disconnecting the current shunt so that current flows through the selected lines. The invention features closing the line selection switches before the shunt is disconnected, and providing the line with adequate impedance to prevent current flow through it until the moment of shunt disconnection so that a fast and reliable timing of drive pulses is achieved.

Figure 1:
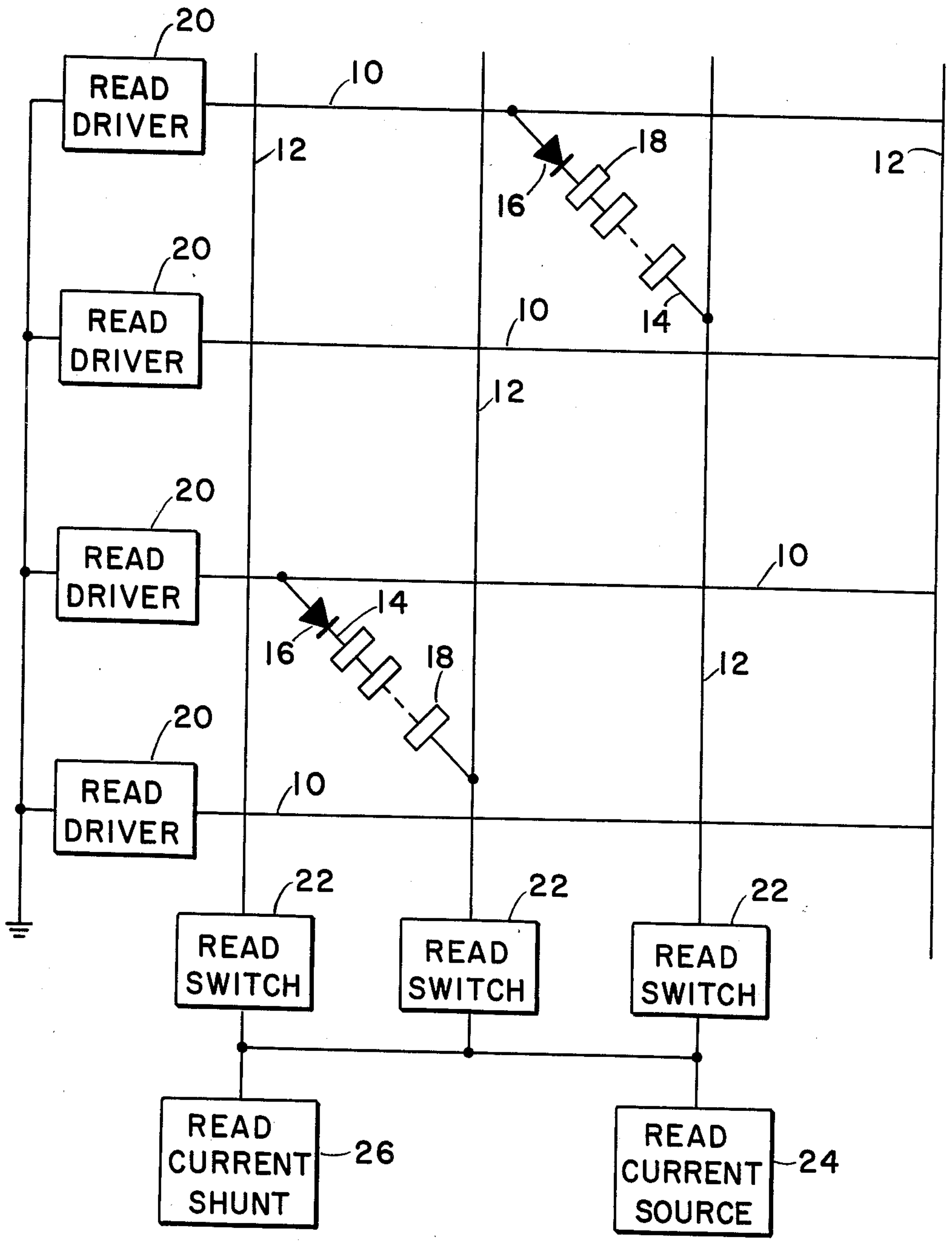
Figure 2:
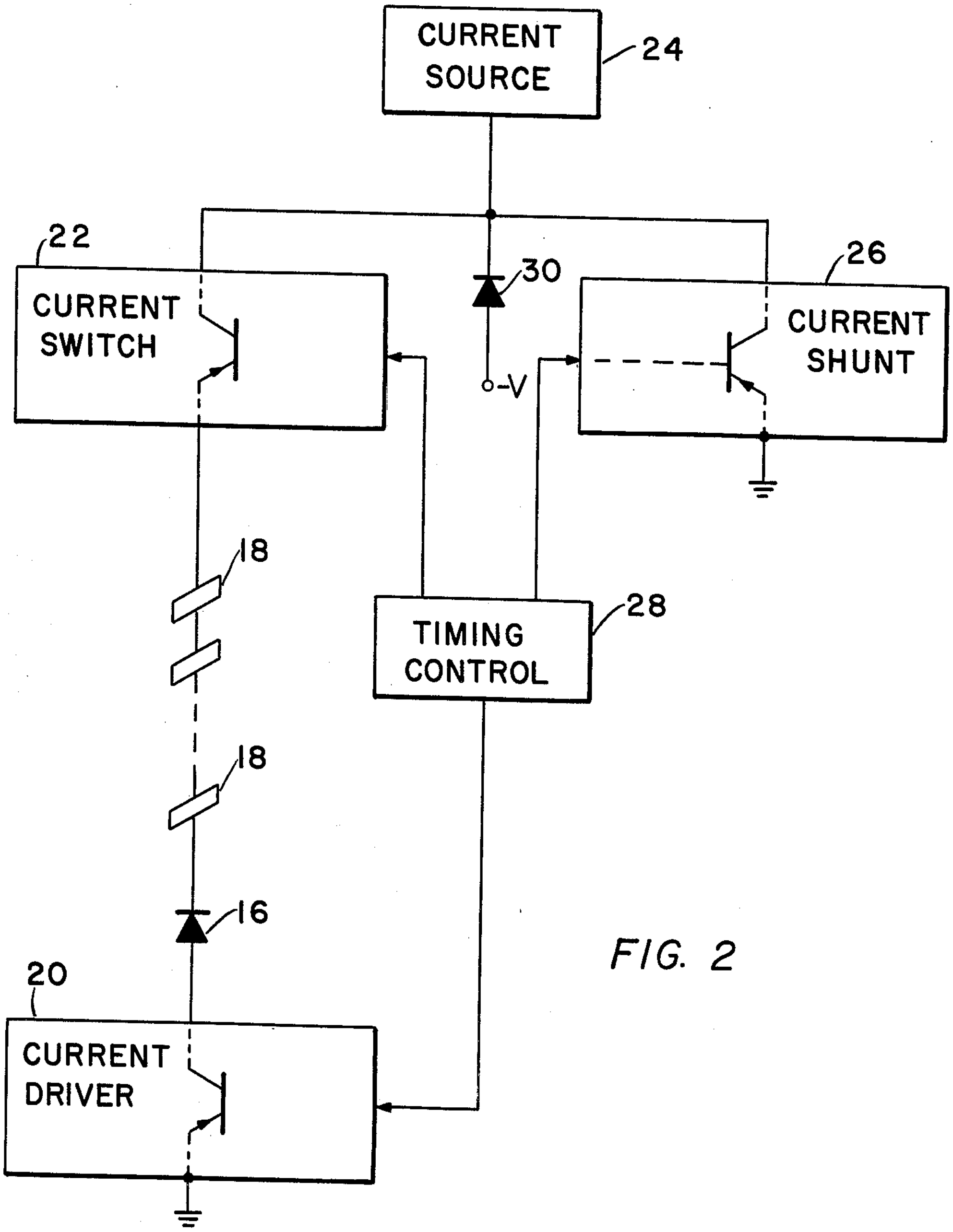

The operation of this illustrative drive system and other objects, features, modifications and embodiments of the invention will be more apparent from the following description with reference to the accompanying drawings wherein:

FIG. 1 is a diagrammatic representation of a magnetic core memory drive system; and FIG. 2 is a simplified diagram of a single drive line from the system of FIG. 1.

Referring to FIG. 1, a plurality of $x$-coordinate conductors 10 and $y$-coordinate conductors 12 are arranged in a plane wherein they define horizontal rows and vertical columns, respectively. Across each of their points of intersection a conductor 14 is provided in series connection with a diode 16, and each conductor 14 links a plurality of magnetic cores 18 to complete the basic configuration of a linear selection magnetic core memory matrix. Each of the horizontal conductors 10 is connected to a separate Read Driver 20 and each vertical conductor is connected, through a separate Read Switch 22, to a common Read Current Source 24 and a common Read Current Shunt 26.

The structure and operation of such a memory matrix is explained in detail in the U.S. patent application previously referenced which may be consulted for specific details. For the purposes of disclosing the present invention a brief description of the operation of a single drive line 14 of the matrix will suffice.

Referring to FIG. 2, current from source 24 is continuously applied. It normally flows through Shunt 26 until a Driver 20 and a switch 22 are energized to complete the continuity of a current path through the conductor 14 and Shunt 26 is disconnected to divert current to the conductor. Timing control 28 sequences this operation so that the Driver 20 and Switch 22 of a selected conductor 14 are both energized before Shunt 26 is disconnected. Although it might be expected that this would result in some current through conductor 14 in advance of the Shunt turn-off and a consequent unreliability in core switching time, this does not occur because the look-in impedance in the direction of conductor 14 from Current Source 24 is several times that in the direction of heavily conducting Shunt 26. The factors contributing to this impedance are the sum of the impedance in the collector-emitter circuits of the Driver 20 and Switch 22 circuits, the impedance of the diode 16 in series with the line and the inductive load of the cores linked by the conductor 14.

Driver 20, Switch 22 and Shunt 26 are represented in FIG. 2 by single transistors. This facilitates explanation of the operation of the circuit. It is to be understood, however, that the drivers and switches of application Ser. No. 65,993, now Patent No. 3,116,543 may be employed here and a suitable Current Shunt circuit is disclosed in copending U.S. patent application S.N. 107,551, filed May 3, 1961, now Patent No. 3,126,490 also assigned to Sylvania Electric Products Inc. and filed concurrently herewith.

When Timing Control 28, in conjunction with conventional memory addressing circuits energizes the transistors in Diver 20 and Switch 22 to conductive condition their base-to-emitter junctions become forwardly biased and ready for current flow. Diode 16 is back biased and prevents current from flowing through the base-to-emitter junction in the transistor of Switch 22. Instead the base current flows through the collector, thereby increasing the current through Shunt 26.

Thus, after address selection, Driver 20, Switch 22 and Shunt 26 are all in conductive condition. Consequently, a very fast and reliably timed current pulse can be transmitted along conductor 14 and through cores 18 when Timing Control 28 cuts-off Shunt 26. The rise time of this pulse will be directly proportional to the fall time of the Shunt. Since, as shown in FIG. 1, a single Source-Shunt combination serves all of the conductors 14, it will be appreciated that to provide fast and accurate rise time on the "read" pulse for the entire matrix only one super-critical circuit is required, viz. Shunt 26.

During turn-off of the "read" pulse, extremely large voltage spikes could occur at the collectors of the Switch and Shunt transistors if Driver, Switch and Shunt circuits were all to be cut-off at one time. Consequently, to prevent transistor break-down, a fast Clamping Diode 30 is provided at the circuit connection to Current Source 24 to shunt voltage spikes to the negative potential applied to the transistors in Current Source 24, e.g. −15 volts.

The turn-off sequence at the end of the current pulse is as follows. First, the Current Driver 20 is turned off and the Current Shunt 26 is turned on at the same timing interval. If, due to the number of transistors in the driving matrix, there is a delay in turn-off time for Driver 20 the fast turn-on of Shunt 26 will pull the current flow away from line 14. On the other hand, if Driver 20 should turn off first, Clamping Diode 30 will shunt the current flow away from the cores. Switch 22 can be turned off at any time after Driver 20, since current through line 14 will have decayed due to the operation of either Shunt 26 or Clamp 30 in the manner just described. The reason for keeping Switch 22 conductive until after Driver 20 has been cut off is to insure a discharge path for the memory line current which cannot change instantaneously because of the self-inductance of the memory windings and cores.

Although the invention has been described with reference to a memory "read" pulse matrix it is equally applicable to a "write" matrix and, in both, speeds up the memory cycle by eliminating the "dead time" of waiting for "worst-case" addressing and switching transistor delays, since only one circuit, viz. the Current Shunt 26, has a critical switching time factor. Also, the invention is not limited to the specifics shown and described but embraces the full scope of the following claims.

What is claimed is:

1. In an electronic data processing memory: a plurality of magnetic memory elements capable of achieving a desired condition of remanent flux in response to a current pulse; a plurality of current pulse conductors in a matrix arrangement of rows and columns linking said elements; a current driver for each row of said current pulse conductors; a current switch for each column of said current pulse conductors; a current source; a current shunt, said current shunt providing a by-pass for current flow from said current source; and, timing control means for causing current to flow through said current pulse conductors when said current shunt is energized, by first energizing said current switch and current driver and then deenergizing said current shunt, and for diverting current from said current pulse conductors by first deenergizing said current driver and energizing said current shunt and then deenergizing said current switch.

2. The invention according to claim 1 wherein a clamping diode is provided as an additional by-pass for the current flow from said current source to prevent voltage spikes.

3. A magnetic core memory matrix driving system comprising: a plurality of substantially square hysteresis loop magnetic cores; a plurality of conductors linking said cores; a plurality of current pulse drivers each connected to one end of a corresponding one of said conductors; a plurality of current switches each connected to the other end of a corresponding one of said conductors; a current source; a current shunt by-passing said conductors from said source; means for causing current to flow from said source to selected ones of said conductors by first energizing said drivers and switches of said selected conductors, and subsequently deenergizing said current shunt; and, means for diverting current from said conductors by first deenergizing said drivers and energizing said shunt, and then subsequently deenergizing said switches.

References Cited by the Examiner

UNITED STATES PATENTS

| | | | |
|---|---|---|---|
| 2,939,119 | 5/60 | Einsele | 340—166 X |
| 2,960,681 | 11/60 | Bonn | 340—166 X |

OTHER REFERENCES

Pages 1 and 2, April 1, 1958, Publication I: RCA Technical Notes 121 "Symmetrical Transistors in Magnetic Core Switching Circuits," by R. D. Lohman, published by the Radio Corporation of America, RCA Lab., Princeton, N.J.

IRVING L. SRAGOW, *Primary Examiner.*

JOHN F. BURNS, *Examiner.*